United States Patent [19]

Lucas et al.

[11] 4,093,086

[45] June 6, 1978

[54] WAREHOUSING SYSTEM

[75] Inventors: Lester Wade Lucas; William Marion Albers, both of St. Louis County, Mo.

[73] Assignee: Wetterau Incorporated, St. Louis, Mo.

[21] Appl. No.: 656,315

[22] Filed: Feb. 9, 1976

[51] Int. Cl.² .............................................. B65G 47/00
[52] U.S. Cl. ............................... 214/16.4 A; 214/16 B
[58] Field of Search ............ 214/16 B, 16.4 A, 16.4 C; 52/33, 236

[56] References Cited

U.S. PATENT DOCUMENTS

| | | | |
|---|---|---|---|
| 3,434,604 | 3/1969 | Haldimann et al. | 214/16.4 A |
| 3,520,424 | 7/1970 | Lemelson | 214/16.4 A |
| 3,559,822 | 2/1971 | Lichtenford | 214/16.4 A X |
| 3,803,778 | 4/1974 | Short | 52/33 |

OTHER PUBLICATIONS

Telestack Systems, Cleveland Tramrail's Bulletin 2038A, 5/15/1969.
FMC Pikmaster Bulletin, 8/11/1970.

*Primary Examiner*—Drayton E. Hoffman
*Assistant Examiner*—R. B. Johnson

*Attorney, Agent, or Firm*—Ralph W. Kalish

[57] ABSTRACT

A warehousing system which comprehends an arrangement of a predetermined number of axially parallel storage racks defining access aisles therebetween which are alternatingly for supply and picking purposes. Each rack comprises tiered compartments having open input ends upon the supply aisles and open discharge ends upon the picking aisles. Said racks are bounded at their opposite ends by a truck dock and a traffic flow floor zone continuous with a railway siding. A first merchandise inbound conveyor, axially perpendicular to the racks, is located above the railway siding, and a second such inbound conveyor axially parallel to the racks is along one side of the assemblage thereof. An outbound conveyor, axially perpendicular to the racks, extends above the truck dock and communicates with each picking aisle by conveyor extensions. First mobile load handling units transmit merchandise to the inbound conveyors and therefrom to the racks via the supply aisles, and also transfer loads to transporting vehicles from the outbound conveyor. Second mobile units carry preselected, "picked" merchandise from the storage compartment discharge ends along picking aisles to the related conveyor extensions.

7 Claims, 2 Drawing Figures

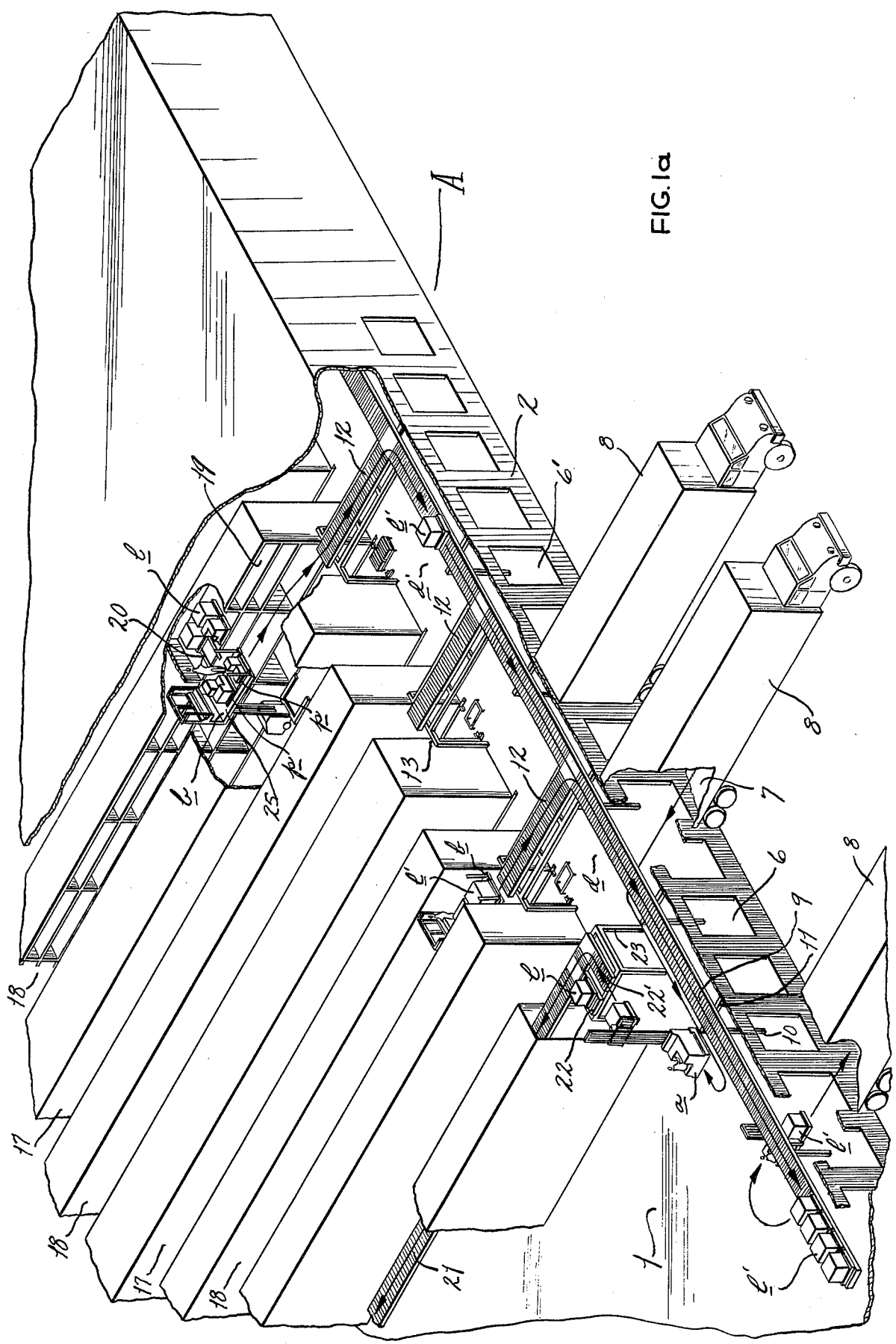

WAREHOUSING SYSTEM

BACKGROUND AND SUMMARY OF THE INVENTION

This invention relates in general to materials handling and, more particularly, to a warehousing system for rapid merchandise storage and retrieval.

In recent years with the ever increasing trade volumes, there has been the constant problem of developing economic and facile means for handling of inbound merchandise at distribution centers and the equally economic and facile delivery of outbound items therefrom to retail outlets pursuant to specific orders. Such centers entail large storage facilities whereby the influx of articles to be stored must be handled in a way to avoid or minimize interference with the concurrent efficient handling of outbound merchandise. There is the admitted necessity of accomplishing retrieval of ordered items at minimum expense, but with a maximum degree of accuracy in order completion. Numerous attempts have been made to develop procedures, systems, techniques, and the like to obtain the aforesaid goals. But to the present time one providing the requisite efficacy has not been known.

Therefore, it is an object of the present invention to provide a warehousing system adapted for the concurrent reception of inbound merchandise from a plurality of delivery mediums and transmitting same to a centralized storage zone in a rapid manner whereby continuous high volume flow of such merchandise may be expeditiously accommodated.

It is a further object of the present invention to provide a warehousing system of the character stated wherein selected withdrawal of merchandise items from storage is achieved in a manner which eliminates obstruction or interference by the simultaneous stocking or replenishment of such withdrawn merchandise, thereby conducing to obviation of error in such retrieval.

It is a still further object of the present invention to provide a system of the character stated incorporated inbound storage and outbound loading sequences which are accomplished in mutually independent fashions so that the traffic jamming, confusion, and attendant costly delays and errors heretofore accepted as hazards and risks inherent within existing warehousing plans are avoided.

It is another object of the present invention to provide a system which is amenable to computer programming thereby enhancing the operating efficiency of the system as well as to reduce the even limited margin for human error.

It is another object of the present invention to provide a warehousing system which may be established within existing warehousing facilities, thus not requiring new constructions; which is markedly efficient in usage so as to bring about substantial economies in time and labor; and which system is extremely versatile, being useful with myriad types of merchandise.

It is also an object of the present invention to provide a warehouse arrangement comprising the unique, relative disposition of merchandise handling conveyors and storage rack structures, all of which may be of existing construction so as to maximize the utilization of available storage area with the storage and retrieval of merchandise being rendered feasible in a manner productive of speedy charging of inbound merchandise to storage racks and the correspondingly rapid dispatch of outbound merchandise therefrom.

DESCRIPTION OF THE DRAWINGS

FIGS. 1a and 1b in combination present a perspective view of a building containing a warehousing arrangement in accordance with and embodying the present invention.

DESCRIPTION OF THE PREFERRED EMBODIMENT

Figure 1B:
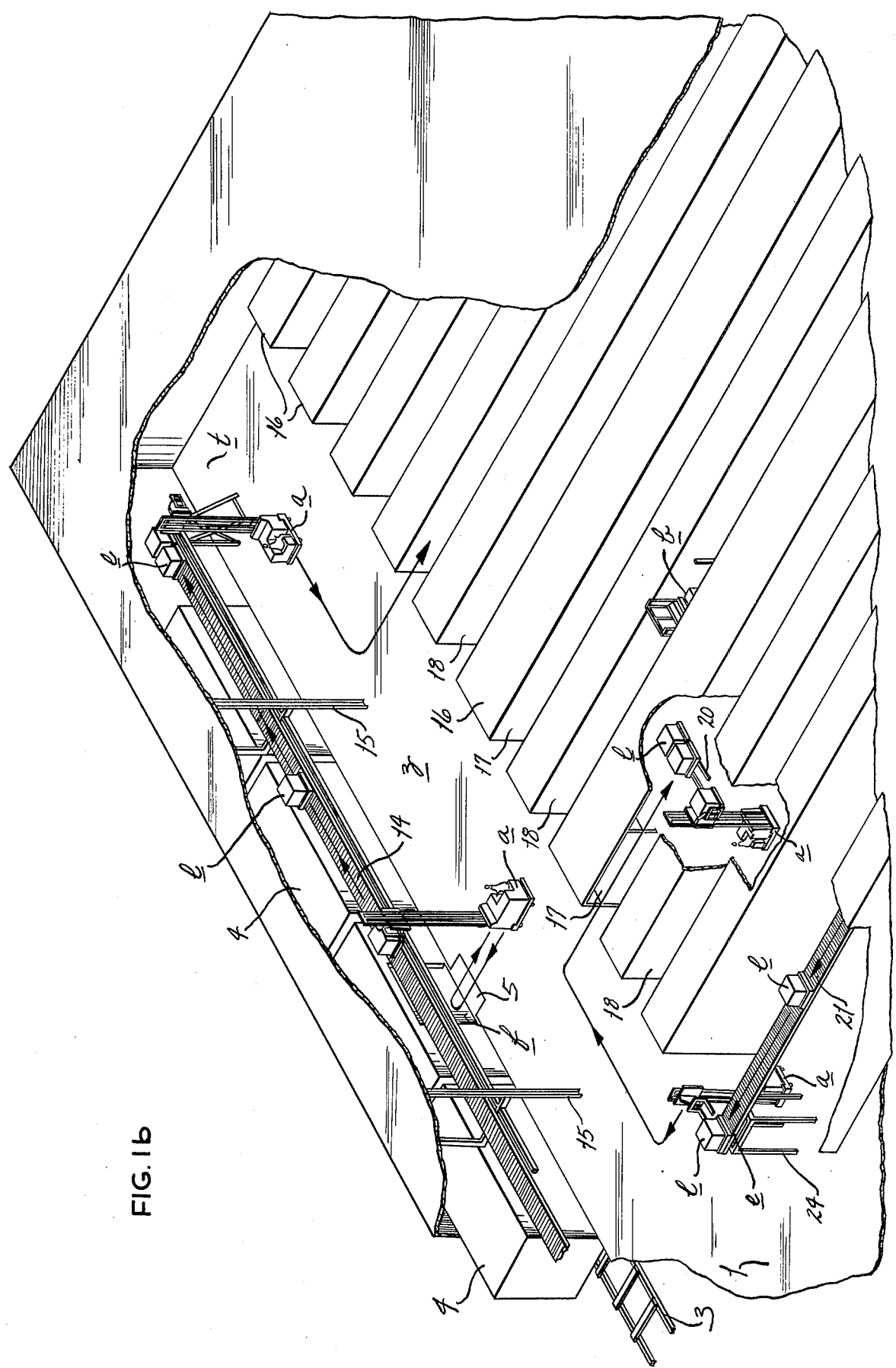

In essence the present invention contemplates a materials handling system comprehending a warehouse arrangement and incorporating fixed components presented within a limited area for operational interconnection by mobile components; which area is bounded on opposed sides by a vehicular shipping dock and a railroad siding, with there being between the latter a multiplicity of axially parallel, spaced-apart elongated storage structures, the major axes of which are perpendicular to the major axes of the said dock and siding. An outbound conveyor is presented in elevated relationship to the vehicular dock and embodies spurs or short extensions for connection to predetermined aisles intervening between the storage structures. Elevated inbound conveyors are provided for facile transport of received merchandise to the storage structures via access aisles between the storage structures which alternate with those connected by the aforesaid spurs. Accordingly, the invention resides in the unique arrangement, as distinguished from the exact construction, of such fixed components and the efficacious utilization of the same; which arrangement is productive of merchandise handling procedures for both inbound and outbound loads, exceeding in efficiency and economy warehousing procedures or techniques hitherto known.

As will become more apparent hereinbelow, the present invention is useful with an unlimited, infinite variety of palletizeable merchandise, such as, for example only, appliances hardware, electronic components, department store wares, automotive accessories, etc., etc. However, one field especially well serviced by the present invention is that of comestibles, such as the items handled by, and encountered in, grocery stores and supermarkets. For purposes of exposition only, reference may be made herein from time to time to the last mentioned field, but without any intention of suggesting restriction thereto.

Referring now by reference characters to the drawings which illustrate the preferred embodiment of the present invention, A designates an enclosed volume, such as a warehouse or distribution center, being preferably of one floor construction, emcompassing floor 1, side walls, end walls, and a roof, none of which are illustrated except a portion of side wall 2. Provided immediately interiorly of the side wall opposite side wall 2 is a rail delivery dock, along the boundary of which a siding 3 progresses the length of enclosure A and with the adjacent portions of the end walls being obviously open for establishing a throughway so that continuous delivery may be effected by railway freight cars 4 in the conventional manner. Rail delivery siding 3 is located with respect to floor 1 so that the floor $f$ of freight cars 4 will be substantially flush with said floor 1 to facilitate movement therebetween, as by a mobile load handling vehicle, of the fork lift type, referred to herein as a fork truck $a$, moving across a low-angle ramp 5.

Side wall 2 is provided with a multiplicity of door openings 6 at appropriate height above ground level to establish a continuous roll-over surface between floor 1 and beds 7 of delivery trucks 8 for both truck loading and unloading purposes, with the area of floor 1 adjacent and bounded by side wall 2 constituting a loading dock $d$. The number of door openings 6 is determined by the overall capacity of warehouse enclosure A and the intended volume of inbound and outbound merchandise to be accommodated. For reasons set forth below, a first series of juxtaposed door openings 6 are disposed for outbound loads, while a second series thereof, identified by the reference numeral 6′, are designed for movement therethrough of inbound loads. Thus dock $d$ includes a zone $d'$ adjacent door openings 6′.

Railway dock 3 merges, and is continuous, with a co-extensive floor zone $z$ of sufficient transverse extent for relatively high volume, non-obstructing traffic flow of fork trucks $a$ and other mobile units. Freight loading dock $d$ may be of less transverse extent than zone $z$.

Immediately inwardly of side wall 2 is an elevated outbound conveyor 9, being suitably supported as by requisite framing comprising uprights 10 and beams 11 which latter connect the upper ends of said uprights 10 to the inner portion of side wall 2. Conveyor 9 is substantially coextensive with wall 2, being axially parallel with the major axis of the latter; and being located spacedly above the upper limits of door openings 6,6′ so as to provide clearance thereunder for fork trucks $a$ to move in unhampered manner to and from trucks 8 for loading or unloading, as the case may be. It will be seen that conveyor 9 is presented immediately adjacent side wall 2 so as to overlie the minimum area of dock $d$ and to reduce the inward extent of the support frame. Conveyor 9 may be of any suitable construction as the precise character thereof does not form a part of the present invention, although for purposes of illustration, the same is desirably of the powered roller type. In its portion above dock section $d'$ conveyor 9 communicates with a predetermined number of spaced conveyor spurs 12 which are axially normal to conveyor 9 and extend over said dock section $d'$ in a direction away from side wall 2. Said conveyor spurs 12 are coplanar with conveyor 9 and are suitably disposed above floor 1 by support framework broadly indicated at 13. Since conveyor spurs 12 will feed outbound loads $l'$ to conveyor 9, all as will be developed more fully hereinbelow, the portion of dock $d$ underlying said conveyors 12 will coincide with the zone $d'$ identified above.

Provided in elevated relationship to floor 1 immediately adjacent the marginal portion of the latter constituting rail delivery siding 3 is an inbound converyor 14 which is axially parallel to outbound conveyor 9, and is supported by a frame structure designated generally 15 being fabricated of any suitable stock, as of channel cross-section, and consisting of integrated uprights and cross-beams which present said conveyor 14 a sufficient distance above floor 1 to permit uninhibited ingress into, and egress from, freight cars 4 by fork lift trucks $a$ and overlies but a limited portion of floor zone $z$. Inbound conveyor 14 is substantially coextensive with siding 3, and is of conventional construction, being also preferably of the powered roller type.

Arranged in mounted disposition upon floor 1, between outbound conveyor 9 and inbound conveyor 14 is a plurality of parallel rows of storage rack structures 16 being bounded at opposite ends by floor zone $z$ and dock $d$; said rack structures thus have their axes perpendicular to the longitudinal axes of conveyors 9 and 14. Rack structures 16 are in spaced-apart relationship for defining access aisles between immediately adjacent structure 16 which aisles, for purposes to be described, are accorded reference numerals 17,18 being in alternating relationship with each of the latter, but terminating at their dock $d$ adjacent ends by a conveyor spur 12 which is coaxial therewith. The ends of said conveyor spurs 12 remote from outbound conveyor 9 coincide substantially with the proximate end of the related access aisle 18. The other end of aisle 18 freely opens into floor zone $z$. Aisle 17 opens unrestrictedly at their opposite ends into floor zone $z$ and dock $d$. The precise construction of rack structure 16 is not of immediate moment as the same may be of any currently available character, with such structure 16 embodying throughout their length a multiplicity of series of vertically arranged or tiered compartments or slot-like bins 19 for storage merchandise, extending transversely of the related rack structure 16 and being open at their opposite ends for access thereinto from the particular bordering aisle 17,18. The height of storage compartments 19 is adequate for unimpeded reception of fully palletized loads $l$ of the particular merchandise preselected for stocking therein. As may be evident from the foregoing, for purposes of clarity, palletized loads for deposit within compartments 19 are designated $l$; with the recognition that each such load $l$ is not of monolithic character, but comprehends a multiplicity of discrete, stacked merchandise units, usually in interlocking relationship, such as containers, cases, and the like, for ultimate retrieval by individual units, as distinguished from the entire load $l$. Each compartment 19 is provided with gravity conveyors, indicated 20, mounted for extension from the end of the related compartment 19 opening on the proximate aisle 17 to the opposite end on the adjacent aisle 18. The number of conveyors 20 for each compartment 19 is determined by the dimension of such compartment 19 progressing in a direction lengthwise of the associated rack structure 16, which dimension, in turn, is a function of the normal rapidity of disposition of the particular merchandise stored therein. Accordingly, some compartments 19 may have but a single gravity conveyor 20 while others may have two or more. It is, or course, obvious that the degree of declination of said conveyors 20 is slight, being merely adequate to facilitate movement of palletized loads $l$ toward the proximate aisle 18.

The height of rack structure 16 is a matter of selection, with appropriate consideration being given to the height of enclosure A, as well as the maximum height at which the particular trucks and related vehicles may efficiently accomplish load handling operations.

Substantially bridging the distance between dock $d$ and floor zone $z$ is an inbound conveyor 21, the major axis of which is parallel to the axes of rack structure 16 and is, hence, in axial perpendicular relationship to outbound conveyor 9 and inbound conveyor 14. Said conveyor 21 is in elevated relationship to floor 1 and desirably coplanar with conveyors 19,14; said conveyor 21 being supported in such position by suitable means, as by independent framework, which may be enclosed.

The end portion of inbound conveyor 21 proximate outbound conveyor 9 extends toward the latter, beyond the adjacent end of the proximate rack structure 16, partially overlying dock $d$; and in its related end extremity is provided with a plurality of relatively short, load charging extensions or spurs, as shown at 22,22', which latter are axially perpendicular to the longitudinal axis of conveyor 21 and, hence, axially parallel to outbound conveyor 9. Load charging extensions or spurs 22,22' are suitably maintained spacedly above floor 1 by support framework 23. Such extensions permit of simultaneous deposition of more than one palletized load $l$ conditioned to high volume handling of inbound freight from trucks 8. The opposite end extremity $e$ of conveyor 21 projects slightly beyond the related end of the proximate rack structure 16, partially overlying floor zone $z$, and being mounted upon a frame 24 thereby rendering loads $l$ reaching said end $e$ readily approachable from manipulation by fork trucks $a$. With the above described fixed components mutually related in the pattern set forth, it is evident that outbound conveyor 9 serves to accept palletized loads $l'$ deposited upon the various conveyor spurs 12 for travel along conveyor 9 in a direction indicated by the arrows, that is, toward the lower left hand portion of FIG. 1$a$. Loads $l'$ thus constitute an assemblage of load units "picked" for fulfilling orders received by the warehouse operator. Inbound conveyor 14 serves to receive and transmit palletized loads $l$ from freight cars 4, with such loads moving in a direction, indicated by arrows, toward the terminus of said conveyor 14, that is, in a direction away from inbound conveyor 21, to a point $t$ above the proximate end portion of zone $z$, at the upper right hand portion of FIG. 1. Inbound conveyor 21 serves to accept and transmit palletized loads $l$ from freight trucks 8 to zone $z$ from which latter all compartment-stocking operations is initiated. The warehouse arrangement above described, and as illustrated in combined FIG. 1, demonstrates what might be considered a warehouse integer or entity for location between a rail delivery siding and a truck dock, comprehending a storage and retrieval complex of a multiplicity of axially parallel spaced-apart rack structures 16 with an outbound and a pair of inbound conveyors 9,14,21, respectively, located on three sides of such complex. As shown in the drawings, for purposes of illustration only, there are five conveyor spurs 12 coordinating with five aisles 18, with there being five alternating aisles 17, all as developed by the provision of eleven rack structures 16; but manifestly more or less rack structures 16 may be incorporated as space and operation requirements may permit. Such integer or entity is a compact, space-economizing module which may be repeated depending upon the available floor area. The above described entity or unit is thus not to be determined restrictive, but is merely expositive of a highly efficacious coordination of system components.

Aisles 17 are, as suggested, storing or supply avenues according passage therethrough of fork trucks $a$ carrying loads $l$ for storage within compartments 19 for maintaining same in stocked condition. Aisles 18, which as shown above, communicate with conveyor spurs 12 at their freight dock adjacent ends, are designed for picking or retrieval purposes, that is, to provide passage for picker fork trucks $b$ in order that load units may be selected from the various compartments 19 for order filling purposes. Although the precise construction of none of the fork lift trucks $a$, $b$, or other mobile units capable of functioning within the present system, do not form a part of this invention, the nature of the picker trucks $b$ should be observed for full appreciation of the potential of such system. Said trucks $b$ embody an elevatable platform 25 of such dimension as to receive, desirably, two empty pallets $p$ in side-by-side relationship, each receiving load-composing merchandise units to develop concurrently a pair of palletized loads $l'$ pursuant to specific orders; said platform 25 also permits movement along either side thereof by an individual for effecting transfer of the units from the adjacent compartment 19 onto the related pallet $p$. Platform 25 is of appropriate transverse extent substantially spanning the distance between rack structure 16 defining the particular aisle 18 but yet allowing of unhindered travel therealong of the truck $b$. Admittedly, platform 25 could be dimensioned for a single pallet $p$, but it has been found in practice that capacity for a pair of pallets $P$ has produced marked economies in operation.

From the foregoing, the effectiveness of the above described system should be apparent. With delivery trucks 8 backed to door openings 6' along dock portion $d$, fork trucks $a$ remove palletized loads $l$ from such delivery trucks 8 and transport same to extensions 22,22' of conveyor 21, and deposit said loads $l$ upon the powered rollers thereof for traverse along said inbound conveyor 21 to the opposite end $e$ thereof. Upon arrival of load $l$ at conveyor end $e$, the same are engaged by other fork trucks $a$ for transmission to the particular storage or supply aisle 17 for storing within the compartment 19 previously designated for such merchandise constituting the load $l$; said load $l$ being thus discharged on the related gravity conveyor 20 for direction toward the opposite end of such compartment 19. In the event there may be a palletized load $l$ within such compartment 19 from an earlier deposition, the insertion of the additional load $l$ will assist in propelling the former along the associated conveyor 20 toward the merchandise removal end of such compartment 19.

Inbound loads $l$ are transferred but a very limited distance from freight trucks 8 to inbound conveyor 21 which latter moves such loads $l$ substantially the width of the warehouse enclosure A in elevated state, fully removed from floor 1 so as to obviate the possibility that such loads $l$ could obstruct traffic flow upon floor 1. Loads $l$ also cover but a short distance over floor zone $z$ from conveyor 21 to the particular, assigned compartment, so that by the arrangement presented, fork trucks $a$ effect minimum travel conducing to extreme efficiency.

The transmission of like loads $l$ from railway freight cars 4 to the ascribed compartments 19 follows a related path in that inbound fork trucks $a$ obtain loads $l$ from such cars 4 and deposit same upon elevated inbound conveyor 14 for movement to the end thereof, as at $t$, remote from conveyor 21, for removal by other fork trucks $a$ for transport to the appropriate storage aisle 17 having the compartments 19 assigned for such loads $l$. The present invention is so developed that loads $l$ received from freight cars 4 may be stored within storage aisle 17 proximate the withdrawal end $t$ of conveyor 14 while the remaining storage aisle 17 may receive loads $l$ from delivery trucks 8, such being in proximity to inbound conveyor 21, thereby tending to eliminate the possibility of interfering action by fork trucks $a$ carrying loads $l$ from conveyors 21 and 14 within floor zone $z$.

The outbound sequence or flow of compiled loads $l'$ from warehouse enclosure A is initiated by operation of picker fork trucks $b$ moving along picking aisles 18 for selected withdrawal of load units from the various compartments 19 opening upon such aisle in order to complete particular orders, such as received from stores serviced by the warehouse. Trucks *b* will move along the associated aisle 18 with the truck operator located upon one side of platform 25 for retrieving load units from compartments 19 upon such side of said aisle; with elevation of depression of platform 25 being effected for appropriate positioning. With two pallets *p* upon platform 25 the operator may conveniently fulfill two prescribed merchandise orders. Should the forwardmost pallet *p* in any particular compartment 19 become empty, the operator will remove same for storage in an empty pallet depot as within a readily accessible compartment 19 in the lower portion of the adjacent rack structure 16 for subsequent use. The truck operator upon such empty pallet removal will, as by a suitable hand tool, assist the loaded pallet *l* at the rear of the particular compartment 19 to move downwardly of the related gravity conveyor 20 for facile unit withdrawal. After completing traverse of aisle 18 for "picking" from one side thereof, fork truck *b* will re-negotiate such aisle 18 to allow the operator to obtain ordered units from compartments 19 on the other side thereof. Upon termination of reciprocal travel of the pertinent aisle 18, fork truck *b* will deliver the two pallet loads *l* to the conveyor spur 12 at the end of said aisle 18 for transmittal thereby to outbound conveyor 9 for transport therealong to the portion overlying door opening 6 whereat fork trucks *a* will carry the same from conveyor 9 for loading on freight trucks 8. Thus conveyor 9 is used for pallets containing stored orders, and the length of such conveyor beyond dock zone *d'* is determined by the number of stores serviced by the present distribution system, with each such store having preferably a prescribed door opening 6. Understandably, the number of door openings 6 is not critical since any number may be provided for facilitating prompt loading.

From the above it is quite apparent that the present invention represents a unique improvement over existing systems with rapid and reliable merchandise storage retrieval being achieved in a most desired cost-saving fashion. The present system is amenable to computer programming so that compartment storing, more commonly referred to as "slotting", together with inventory control, as well as batch or selected picking, may be fully computerized. Such computer controlled operations will enhance the accuracy factor.

Furthermore, the system may be, if desired, further refined by automatic signaling devices for indicating the proper positioning of the various trucks *a,b* for load handling purposes, thereby relieving the individual operators from the burden of estimating requisite location for the particular operations, as well as to reduce the element of accident.

Having described our invention, what we claim and desire to obtain by Letters Patent is:

1. A merchandise warehousing arrangement comprising a support surface, a plurality of rows of a multiplicity of storage racks in aligned side by side relationship, adjacent ones of said rows being parallel and spaced apart a distance sufficient to define therebetween an access aisle, a plurality of loading vehicles adapted to move therein, a merchandise outbound conveyor elevated above said support surface and having its path of travel in axially perpendicular relationship to the longitudinal axis of the storage racks rows, conveyor spurs elevated above said support surface connecting the proximate ends of preselected access aisles and said outbound conveyor, a first inbound conveyor elevated above said support surface and having its direction of travel in axially parallel relationship to the longitudinal axis of said rows of storage racks, said first inbound conveyor presented along the length of and parallel to at least one of said rows of storage racks and extending substantially between first and second load handling zones, said load handling zones being at opposite ends of said rows of storage racks, said first and second load handling zones respectively providing first and second vehicle loading docks each having a respective boundary spaced from the ends of said rows of storage racks and extending in perpendicular relationship to the longitudinal axis of said rows of storage racks, a second merchandise inbound conveyor elevated above said support surface and overlying a portion of said second load handling zone, said second merchandise inbound conveyor being positioned above said second loading dock and adjacent said second loading dock boundary and having its travel path along said boundary in axially perpendicular relationship to the longitudinal axis of said rows of storage racks and disposed in spaced apart relationship to the ends of said storage rack rows remote from said outbound conveyor, a railway siding presented upon the side of said load handling zone remote from said storage racks and in axially perpendicular relationship to said storage racks, said second inbound conveyor means presented in overlying relationship to the portion of said load handling zone immediately proximate said railway siding, said first inbound conveyor being spaced at its ends from said outbound conveyor and said second inbound conveyor, said merchandise outbound conveyor being positioned above said first loading dock and adjacent said loading dock boundary and having its travel path along the last said boundary, said merchandise outbound conveyor overlying a portion of said first load handling zone, said first and second inbound conveyors permitting inbound merchandise handling at both said first and second load handling zones without interference with outbound merchandise handling at said first load handling zone, the extent of elevation of said merchandise outbound conveyor, said conveyor spurs and said first and second inbound conveyors being sufficient to permit movement of fork trucks or other mobile loading units therebeneath and to allow of facile load handling therebeneath by personnel with respect to vehicles adjacent each of said first and second loading dock boundaries.

2. A merchandise warehousing arrangement as defined in claim 1 and further characterized by a plurality of merchandise feeding means provided at the end of said first inbound conveyor proximate said load handling dock.

3. A merchandise warehousing arrangement as defined in claim 1 and further characterized by said outbound conveyor and said first and second inbound conveyors being in elevated relationship to said support surface, said support surface beneath said outbound conveyor and between same and the adjacent ends of the rows of said storage racks defining a load handling dock, and the portion of said support surface beneath said second inbound conveyor and the proximate ends of said storage rack rows defining a load handling zone, the extent of elevation of said outbound conveyor and said first and second inbound conveyors being sufficient to allow of facile load handling therebeneath by personnel.

4. A merchandise warehousing arrangement as defined in claim 3 and further characterized by said load handling dock and said load handling zone having their lesser dimensions extending in the same direction as the axes of said storage rack rows and with the lesser dimension of said load handling dock being of less extent than that of said load handling zone.

5. A merchandise warehousing arrangement as defined in claim 3 and further characterized by said means connecting the proximate ends of preselected access aisles and said outbound conveyor comprising conveyor spurs, the axes of which are perpendicular to that of said outbound conveyor.

6. A merchandise warehousing arrangement as defined in claim 1 and further characterized by each of said storage racks within each storage rack row having tiered compartments with an inlet end and an outlet end the racks within said rows being arranged to present an alternating pattern whereby the storage racks on either side of one access aisle are disposed to prevent the respective outlet ends thereof in confronting relationship so that the racks on the either side of said aisle open toward each other thereby causing the intervening aisle to define a merchandise picking aisle and whereby the inlet ends of such storage racks open onto an adjacent aisle so that the racks on either side of such adjacent aisle are disposed to present the inlet ends thereof directed toward each other in confronting relationship whereby the aforesaid aisle defines a merchandise supply route.

7. A merchandise warehousing arrangement as defined in claim 6 and further characterized by conveyor spurs disposed in said aisles defining merchandise picking routes, the axis of the path of travel of said conveyor spurs being perpendicular to that of said outbound conveyor, said spurs connecting the outbound conveyor and such merchandise picking aisle, and merchandise moving means provided within said storage racks facilitating transfer of merchandise from the inlet end to the outlet end thereof.

* * * * *

UNITED STATES PATENT OFFICE
CERTIFICATE OF CORRECTION

Patent No. 4,093,086           Dated June 6, 1978

Inventor(s) Lester Wade Lucas and William Marion Albers

It is certified that error appears in the above-identified patent and that said Letters Patent are hereby corrected as shown below:

Column 9, claim 6, line 17, "prevent" should read -- present --.

Signed and Sealed this

*Twenty-first* Day of *November 1978*

[SEAL]

Attest:

RUTH C. MASON
*Attesting Officer*

DONALD W. BANNER
*Commissioner of Patents and Trademarks*